Almquist & Ofeldt,
Mechanical Movement.
No. 99,518. Patented Feb. 8, 1870.
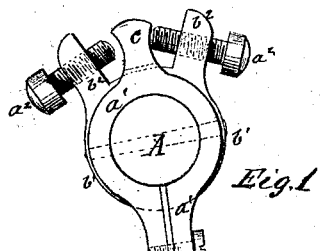
Fig. 1
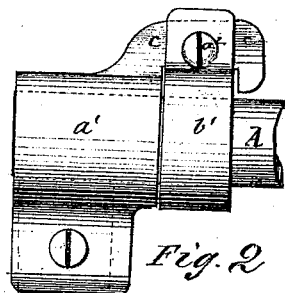
Fig. 2
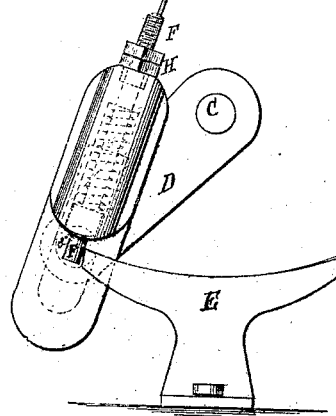
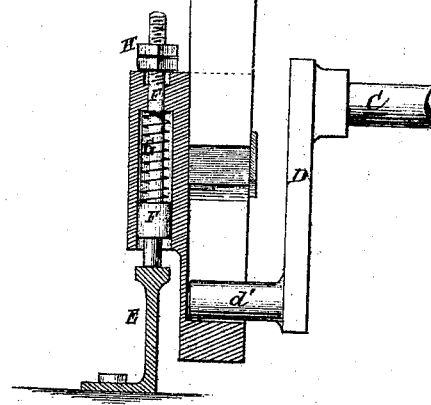
Witnesses:
Charles A. Nash
Chas. Nida
Inventors:
A. W. Almquist
F. W. Ofeldt

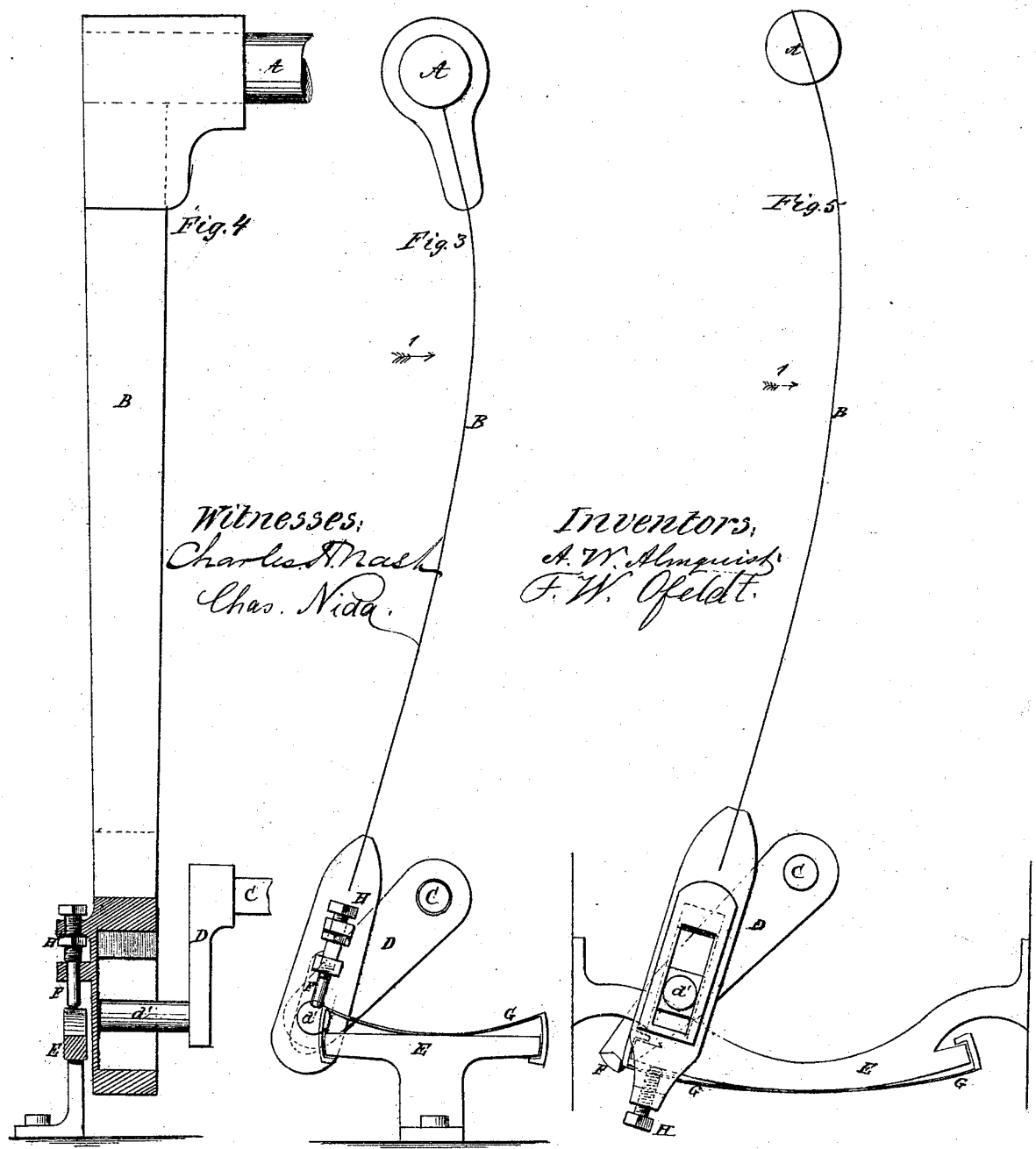

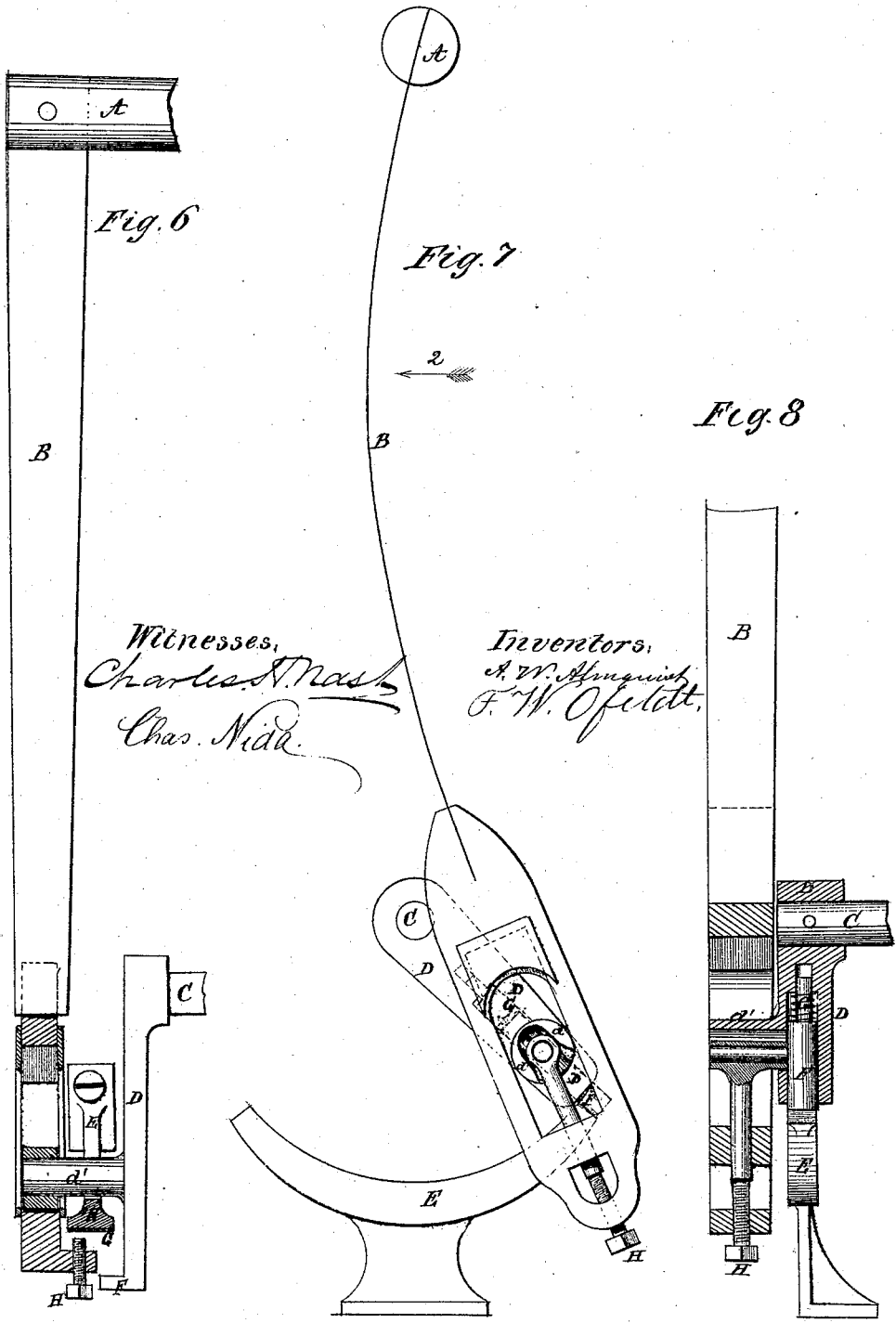

United States Patent Office.

A. W. ALMQVIST AND F. W. OFELDT, OF NEW YORK, N. Y.

Letters Patent No. 99,518, dated February 8, 1870.

CUT-OFF VALVE-GEAR.

The Schedule referred to in these Letters Patent and making part of the same.

*To all whom it may concern:*

Be it known that we, A. W. ALMQVIST and F. W. OFELDT, of the city, county, and State of New York, have invented a new and improved Mechanical Movement; and we do hereby declare that the following is a full, clear, and exact description thereof, which will enable others skilled in the art to make and use the same.

This invention has for its object to furnish a new and improved mechanical movement, applicable for operating the valve or cut-off of steam-engines, gas and water-meters, and all other engines in which the pressure of a gaseous or liquid body is employed as motor, as also in all other kinds of machinery, where an oscillating or reciprocating motion, with uniform or variable stroke may be combined with (to regulate or be regulated by) an intermittent motion, of any length of stroke, and of variable or constant length of time of rest at either end of its stroke; and It consists in combination of the various parts, as will be hereinafter described.

In the accompanying drawings, forming part of this specification—

Figure 1, (Sheet I,) represents a front or face view of our improved mechanical movement.

Figure 2, (Sheet I,) a sectional side view of fig. 1.

Figures 3 and 5, (Sheet II,) and Figure 7, (Sheet III,) represent face views of modifications of the same movement.

Figure 4, (Sheet II,) and Figures 6 and 8, (Sheet III,) are sectional side views of figs. 3, 5, and 7, respectively.

Similar letters of reference indicate like or equivalent parts.

A is an axle, which may be connected with machinery movable, by the pressure of a gas or liquid, or by other power.

B is a spring, attached to said axle A, either directly, or by the collar or sleeve $a'$, movable on the axle A, which motion may be regulated by the screws $a''$, on the projections $b''$ of the collar $b'$, the latter being securely fastened, by a pin, or otherwise, to the axle or shaft A.

C is the axle or fulcrum of a valve, or other device, to which an intermittent motion is to be imparted through the spring B.

D is the lever of motion, acting on the fulcrum C.

Said lever D is provided with a pin, $d'$, connected with spring B.

E is a stop-plate, curved or inclined on its working-surface, and of a length corresponding to the desired distance of motion of the pin $d'$.

Instead of the plate E, may be used inclined catches or other devices, applicable as stops, placed at the same distance apart.

F is a stop-pin, connected either with the spring B, (as shown in figs. 1, 2, 3, and 4,) or with the lever D, (as shown in figs. 5, 6, 7, and 8)

G is a spring, which, yielding to the pressure of the stop-pin F, during motion of the pin $d'$, expands at the end of the stroke, retaining the stop-pin F at rest at the ends of the stop-plate E, until released by the bending of the spring B.

The spring G may be attached either to the stop-pin F, (as in figs. 1, 2, 7, and 8,) or to the stop-plate E, (as in figs. 3, 4, 5, and 6.)

The length of contact between the stop-pin and stop-plate, and thereby the time of rest of the pin $d'$ of the lever D, after completed stroke, as also the tension of the spring B, to suit its work, are regulated by the screw-thread and nut H, which may be made either as a part of the stop-pin F, (as in figs. 1, 2, 3, 4,) or separately, (as in figs. 5, 6, 7, 8.)

The operation is as follows:

Supposing, for illustration, that A is a rock-shaft, oscillated by connection with a reciprocating piston, and that the lever D is working a valve, alternately reversing its connection with supply and discharge ports. The movement of the axle in the direction of the arrow 1, (figs. 1, 3, 5,) bends the spring B, which, being thus bent, rises above the contact of the stops, when, expanding, it reverses the position of the lever D, and the valve operated, thereby changing the position of its ports. The stop-pin F is then retained at the opposite end of the stop-plate E, until, by the return motion of the piston, the spring B is again bent in the direction of the arrow 2, (fig. 7,) sufficiently to release the stops, when the valve is again reversed, and so on, continuously.

By adjusting the length of contact between the stop-pin and stop-plate, by means of the thread and nut H, the stroke of the piston may thus also be varied.

Said stroke may be further increased, without increasing the flexion of the spring B, by unscrewing the set-screws $a''$, in the lugs of the collar $b'$, a greater or lesser distance out of contact with the projections $c$ on the collar $a'$.

In the case of slow velocity, and where the movement, constructed as shown in figs. 1 and 2, is placed vertically, the spring G may be dispensed with, as the weight of the stop-pin F is sufficient to cause it to fall, after passing the ends of the stop-plate E.

Claims.

Having thus described our invention,

What we claim as new, and desire to secure by Letters Patent, is—

1. A mechanical movement, composed of the following elements: The spring B, lever D, stop-plate E, or equivalent, and stop-pin F, with or without the spring G, in combination with the axles or fulcra A and C, substantially as described and shown, for the purposes set forth.

2. The combination of the collar $b'$, and set-screws $a''$, with the sleeve or collar $a'$, substantially as shown and for the purpose set forth.

The above specification of our invention signed by us, this 24th day of September, 1869.

A. W. ALMQVIST.
F. W. OFELDT.

Witnesses:
CHARLES H. NASH,
CHAS. NIDA.